United States Patent
Wingate

(10) Patent No.: US 10,269,343 B2
(45) Date of Patent: Apr. 23, 2019

(54) AUDIO PROCESSING USING AN INTELLIGENT MICROPHONE

(71) Applicant: Analog Devices, Inc., Norwood, MA (US)

(72) Inventor: David Wingate, Provo, UT (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 15/505,736

(22) PCT Filed: Aug. 27, 2015

(86) PCT No.: PCT/US2015/047079
§ 371 (c)(1),
(2) Date: Feb. 22, 2017

(87) PCT Pub. No.: WO2016/033269
PCT Pub. Date: Mar. 3, 2016

(65) Prior Publication Data
US 2017/0243577 A1    Aug. 24, 2017

Related U.S. Application Data

(60) Provisional application No. 62/043,124, filed on Aug. 28, 2014.

(51) Int. Cl.
H04R 3/00 (2006.01)
G10L 15/00 (2013.01)
(Continued)

(52) U.S. Cl.
CPC .............. *G10L 15/20* (2013.01); *G10L 15/22* (2013.01); *G10L 21/0216* (2013.01);
(Continued)

(58) Field of Classification Search
CPC .......... H04R 3/00; H04R 3/005; H04R 1/406; H04R 25/407; H04R 2410/00;
(Continued)

(56) References Cited

U.S. PATENT DOCUMENTS 5,852,804 A * 12/1998 Sako .................. B60R 16/0373
704/275
6,009,396 A * 12/1999 Nagata .................... G10L 15/26
381/92

(Continued)

FOREIGN PATENT DOCUMENTS

CN    103767260    5/2014

OTHER PUBLICATIONS

International Search Report and Written Opinion for International Patent Application Serial No. PCT/US2015/047079 dated Dec. 4, 2015, 14 pages.

(Continued)

*Primary Examiner* — Thang V Tran
(74) *Attorney, Agent, or Firm* — Patent Capital Group

(57) ABSTRACT

The present disclosure relates generally to improving audio processing using an intelligent microphone and, more particularly, to techniques for processing audio received at a microphone with integrated analog-to-digital conversion, digital signal processing, acoustic source separation, and for further processing by a speech recognition system. Embodiments of the present disclosure include intelligent microphone systems designed to collect and process high-quality audio input efficiently. Systems and method for audio processing using an intelligent microphone include an integrated package with one or more microphones, analog-to-digital converters (ADCs), digital signal processors (DSPs), source separation modules, memory, and automatic speech recognition. Systems and methods are also provided for (Continued)

audio processing using an intelligent microphone that includes a microphone array and uses a preprogrammed audio beamformer calibrated to the included microphone array.

20 Claims, 10 Drawing Sheets

(51) Int. Cl.

| | | |
|---|---|---|
| *G10L 15/20* | (2006.01) | |
| *G10L 21/0272* | (2013.01) | |
| *G10L 15/22* | (2006.01) | |
| *G10L 21/0216* | (2013.01) | |
| *G10L 25/84* | (2013.01) | |
| *H04R 1/40* | (2006.01) | |
| *G10L 21/0208* | (2013.01) | |
| *G10L 15/01* | (2013.01) | |

(52) U.S. Cl.
CPC .......... *G10L 21/0272* (2013.01); *G10L 25/84* (2013.01); *H04R 1/406* (2013.01); *H04R 3/00* (2013.01); *H04R 3/005* (2013.01); *G10L 15/01* (2013.01); *G10L 21/0208* (2013.01); *G10L 2015/223* (2013.01); *G10L 2021/02166* (2013.01); *H04R 2410/00* (2013.01); *H04R 2410/01* (2013.01); *H04R 2499/11* (2013.01); *H04R 2499/13* (2013.01)

(58) Field of Classification Search
CPC ............ H04R 2410/01; H04R 2499/11; H04R 2499/13; G10L 2021/02166; G10L 21/0208; G10L 21/0216; G10L 21/0272; G10L 15/00; G10L 15/20; G10L 15/22; G10L 2015/223; G10L 2015/225; G10L 25/84
See application file for complete search history.

(56) References Cited

U.S. PATENT DOCUMENTS

| | | | |
|---|---|---|---|
| 7,418,392 B1 | 8/2008 | Mozer et al. | |
| 7,979,487 B2 | 7/2011 | Meyer et al. | |
| 2003/0125955 A1* | 7/2003 | Arnold | .................... G10L 15/30 |
| | | | 704/270.1 |
| 2003/0127524 A1 | 7/2003 | Smith | |
| 2003/0177006 A1* | 9/2003 | Ichikawa | ............ G10L 21/0216 |
| | | | 704/231 |
| 2005/0027522 A1* | 2/2005 | Yamamoto | .............. G10L 15/20 |
| | | | 704/233 |
| 2005/0045027 A1 | 3/2005 | Cell et al. | |
| 2005/0049864 A1 | 3/2005 | Kaltenmeier et al. | |
| 2006/0074686 A1* | 4/2006 | Vignoli | ................... G10L 15/26 |
| | | | 704/275 |
| 2007/0294086 A1* | 12/2007 | Suzuki | .................... G10L 15/00 |
| | | | 704/254 |
| 2008/0167886 A1 | 7/2008 | Marcken | |
| 2009/0018828 A1* | 1/2009 | Nakadai | .................. G10L 15/20 |
| | | | 704/234 |
| 2009/0150146 A1* | 6/2009 | Cho | ......... G10L 15/20 |
| | | | 704/233 |
| 2010/0070274 A1* | 3/2010 | Cho | ....................... G10L 15/20 |
| | | | 704/233 |
| 2011/0125496 A1* | 5/2011 | Asakawa | ................. G10L 15/20 |
| | | | 704/231 |
| 2011/0276157 A1 | 11/2011 | Wang et al. | |
| 2012/0221330 A1 | 8/2012 | Thambiratnam et al. | |
| 2012/0243698 A1* | 9/2012 | Elko | ..................... H04M 9/082 |
| | | | 381/66 |
| 2013/0343571 A1 | 12/2013 | Rayala et al. | |
| 2014/0214418 A1* | 7/2014 | Nakadai | ............. G10L 21/0216 |
| | | | 704/233 |
| 2014/0257813 A1 | 9/2014 | Mortensen | |
| 2015/0172842 A1* | 6/2015 | Nakamura | ........... H04R 29/004 |
| | | | 381/92 |
| 2015/0364136 A1* | 12/2015 | Katuri | ...................... H04R 3/02 |
| | | | 704/233 |

OTHER PUBLICATIONS

Holly Francois et al., *Dual-Microphone Robust Front-End for Arm's-Length Speech Recognition*, IWAENC 2006, Paris, Sep. 12-14, 20016, 4 pages.

Yuan-Fu Liao et al., *Subband Minimum Classification Error Beamforming for Speech Recognition in Reverberand Environments*, 978-1-4244-4296-6/10, © 2010 IEEE, ICASSP 2010, 4 pages.

Jozef Ivanecký et al., *Today's Challenges for Embedded ASR*, © Springer International Publishing, Switzerland 2014, MEMICS 2014, 8934, pp. 16-29, 2014.

EN Machine Translation of CN103767260, 3 pages.

* cited by examiner

AUDIO PROCESSING USING AN INTELLIGENT MICROPHONE

CROSS REFERENCE TO RELATED APPLICATION

This application claims the benefit of and priority to U.S. Provisional Patent Application No. 62/043,124 filed Aug. 28, 2014 entitled "AUDIO PROCESSING USING AN INTELLIGENT MICROPHONE", which is incorporated herein by reference in its entirety.

TECHNICAL FIELD OF THE DISCLOSURE

The present disclosure relates generally to improving audio processing using an intelligent microphone and, more particularly, to techniques for processing audio received at a microphone with integrated processing components, including analog-to-digital conversion, digital signal processing, acoustic source separation, and automatic speech recognition.

BACKGROUND

Automatic speech recognition (ASR) is increasingly important. ASR enables users to interact with electronic devices using their voices. However, ASR accuracy also depends on the quality of the voice input signals and signal processing. Like any computational process, sending "garbage in" to an ASR service will result in "garbage out." For example, the audio signal received at a microphone will often be a combination of a user's speech and background noise from any number of other audio sources.

Hardware manufacturers wishing to provide voice control face significant engineering challenges. Some manufacturers struggle to select and configure various components needed for voice control, ranging from microphones to digital signal processors (DSPs). These manufacturers may expend substantial resources and time to cobble together a sub-optimal solution, while other manufacturers choose to leave out voice control entirely.

Overview

The present disclosure relates generally to improving audio processing using an intelligent microphone and, more particularly, to techniques for processing audio received at a microphone with integrated analog-to-digital conversion, digital signal processing, acoustic source separation, and for further processing by a speech recognition system. Embodiments of the present disclosure include intelligent microphone systems designed to collect and process high-quality audio input efficiently. Systems and method for audio processing using an intelligent microphone include an integrated package with one or more microphones, analog-to-digital converters (ADCs), digital signal processors (DSPs), source separation modules, memory, and automatic speech recognition. Systems and methods are also provided for audio processing using an intelligent microphone that includes a microphone array and uses a preprogrammed audio beamformer calibrated to the included microphone array. A highly integrated product facilitates rolling out speech recognition and voice control systems, as well as offer additional improvement to audio processing when the features are integrated in a single product.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Figure 1:
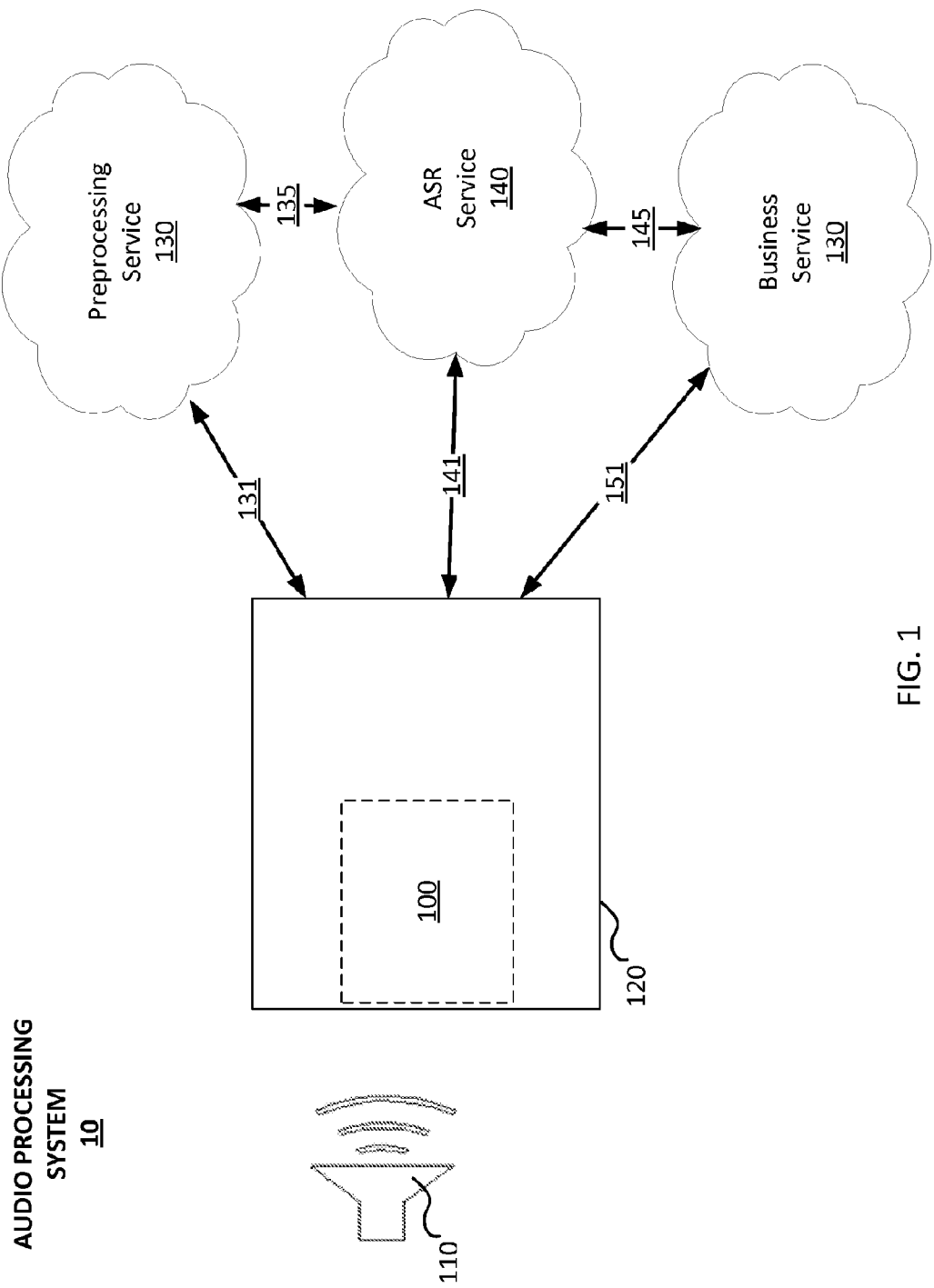
FIG. 1 shows a schematic representation of a system with an integrated intelligent microphone module in accordance with some embodiments of the present disclosure.

Difficulties in Implementing Speech Recognition and Voice Control

Automatic speech recognition (ASR) and voice control are increasingly important features that enable users to control and interact with their devices using their voices. However, device manufacturers may face numerous challenges when attempting to implement these features. Selecting a microphone or microphone array, connecting it to compatible analog to digital converters (ADCs), digital signal processors, and other audio processing circuits may require substantial training and research in acoustics and audio engineering. Not to mention that each audio system design is unique with their own set of application requirements and specifications, and many of the chips and circuits for supporting speech and voice features may have to be selected and configured specifically to the audio system. Therefore, device manufacturers may expend substantial resources reinventing the wheel whenever they want to enhance their hardware with speech and voice capabilities. Furthermore, the resulting system would typically include many discrete chips and parts, which tend to increase the costs and complexity of the overall system.

An Integrated Solution for Speech and Voice

To facilitate implementation, an integrated, "off-the-shelf" package can be implemented with a variety of speech- and voice-related functionalities, which may be otherwise embedded or integrated into a manufacturer's device. As a result, a device manufacturer can readily implement speech and voice functionalities with the "off-the-shelf" package without expending many man-hours and resources. Embodiments of the present disclosure include intelligent microphone systems designed to collect and process high-quality audio input efficiently. Effectively, the device manufacturer can use a "plug and play" integrated circuit or package, dubbed an "intelligent microphone", to provide speech and voice applications for the device.

In some embodiments, the intelligent microphone can include a microphone such as a microphone array. Although in some cases, the intelligent microphone can provide wire connection(s) to the microphone (external or remote from the intelligent microphone). Generally speaking, the intelligent microphone includes circuitry needed for high-quality audio processing. This circuitry may be preconfigured and otherwise hardwired for the particular components included in the intelligent microphone. In some cases, the circuitry can provide one or more inputs for controlling one or more parameters of the intelligent microphone, so that the same intelligent microphone can work for a variety of applications/specifications/operating conditions.

In some embodiments, the circuitry for audio processing processes audio signals in the digital domain. The intelligent microphone may be realized as an integrated circuit including a microphone, analog-to-digital converter (ADC) circuitry configured to convert analog audio signals from the microphone into digital audio signals for further processing, a digital signal processor (DSP) and other circuitry for processing the digital audio signals.

In some embodiments, the circuitry for audio processing processes audio signals in the analog domain. The intelligent microphone analog circuitry may be realized as an integrated circuit including a microphone and analog circuitry for processing analog signals from the microphone. Analog circuitry can include Sampled Analog Technology, which implements various functions, processes, and filters based on the principle of charge sharing.

In some embodiments, the circuitry for audio processing processes audio signals in the analog domain and the digital domain. The intelligent microphone analog circuitry may be realized as an integrated circuit including a microphone, analog circuitry for processing analog signals from the microphone, ADC configured to convert (processed) analog audio signals from the microphone into digital audio signals for further processing, a digital signal processor (DSP) for processing audio signals in the digital domain, and other circuitry for processing the digital audio signals.

The circuitry for audio processing in the intelligent microphone could include one or more of the following: automatic speech recognition (ASR) circuitry for recognizing the processed digital audio signals as speech, beamforming circuitry (preconfigured for a geometry of the microphone array), a network interface for sending processed digital audio signals to a remote ASR service over the network, a microphone array, source separation circuitry, noise reduction circuitry, and interfaces for connecting to a network or other parts of a device. Other speech- and/or voice-related circuitry can also be included in the intelligent microphone.

In one example, a device manufacturer could embed the intelligent microphone into its device, and, with minimal or zero configuration, the intelligent microphone can receive raw analog audio input via the microphone and output high-quality recognized speech. An intelligent microphone may perform advanced audio processing techniques, including one or more of the following: beamforming with a microphone array, background noise reduction, noise reduction, source separation, and other processing with minimal or no setup or calibration by a manufacturer or end user. For example, a user might be in an environment with noise that interferes with the user's voice signals. Background or ambient noise, echoes, wind, and other interference while outside, in the car, at a party, or other noisy environments can also result in audio input that would benefit from advanced audio processing techniques to improve the accuracy of the ASR process.

In some situations, a manufacturer may prefer to use a remote (e.g., cloud-based) ASR service or a remote device having ASR implemented thereon. In these situations, the manufacturer may use an intelligent microphone that receives raw analog input via the microphone and processes it to output high-quality digital voice signals that are optimized for sending to the remote ASR service or device. The intelligent microphone may include integrated interfaces for connectivity, or it may be configured to leverage interfaces for connectivity elsewhere within the device.

In addition to conserving resources on the device, there may be other advantages to using an intelligent microphone with a remote ASR service. For example, ASR service providers can collect and analyze utterances from different speakers to improve the accuracy of the ASR over time without necessarily requiring any hardware or software updates to the user's mobile device. Additionally, ASR service providers can provide value-added services beyond converting speech to text. For example, if the ASR service provider determined that a user said, "What is the weather today?" the ASR service could perform a search and return the weather information to the user instead of, or in addition to, the recognized text. The ASR service provider can add additional features, voice commands, and other value-added services, such as natural language processing and artificial intelligence, without necessarily requiring any hardware or software updates.

In accordance with an embodiment of the present disclosure, another technique for improving audio input is to use additional microphones in a microphone array. If a device has at least two microphones, and the microphone geometry (e.g., position and orientation of the microphones relative to one another) is known, a device can analyze the phase and amplitude differences in the signals received at each microphone to perform audio beamforming. Beamforming is spatial, or directional, filtering. If the device can determine the approximate direction of the audio source, it can filter out interfering audio sources coming from different directions. In some cases, the beamformer can be fixed, such that it assumes the speaker is always oriented in a particular location or direction relative to the device (e.g., the driver in a car, or mouth with respect to a headset). In other cases, the device can perform adaptive beamforming, steering the beam as the location of the speaker changes. Increasing the number of microphones in the microphone array can provide the beamformer with additional signals to form beams more precisely. However, beamforming is also a computationally intensive process that may benefit greatly from an integrated, end-to-end solution.

In addition to interference from the user's environment, the quality of the audio input from the device can also depend on the quality of the device's hardware for collecting and processing the audio input. For example, if a mobile device has a low-quality microphone or a low-resolution analog-to-digital converter, ASR software or services, or other special-purpose audio enhancement software, might not be able to improve the audio input enough for the ASR services to recognize the speech accurately. For example, a remote ASR service provider depends upon device manufacturers to select hardware components with adequate quality. Furthermore, the device's processing or memory resources could be too constrained to support the minimum requirements for off-the-shelf signal enhancing software. Without an end-to-end solution, device manufacturers may need to compromise on features or quality.

Users want more accurate speech recognition. Device manufacturers want to conserve system resources. ASR service providers perform better when they receive higher quality audio input. Nevertheless, it can be challenging for a device manufacturer to integrate microphones, analog-to-digital converters (ADCs), digital signal processors (DSPs), and other components to improve performance and accuracy.

The disclosure describes network elements, computers, and/or components of systems and methods for audio processing using an intelligent microphone that may include one or more modules. As used herein, the term "module" may be understood to refer to computing software, firmware, circuitry, logic, hardware, and/or various combinations thereof within the intelligent microphone. Modules in the intelligent microphone, or the intelligent microphone module itself, however, are not to be interpreted as software which is not implemented on hardware, firmware, or recorded on a non-transitory processor readable recordable storage medium (i.e., modules are not software per se). It is noted that the modules are exemplary. The modules in the intelligent microphone may be combined, integrated, separated, and/or duplicated to support various applications. Also, a function described herein as being performed at a particular module may be performed at one or more other modules and/or by one or more other devices instead of or in addition to the function performed at the particular module. While the intelligent microphone includes a plurality of modules, the modules are preferably packaged as a single unit together to form the intelligent microphone, as e.g., a system-on-chip (SoC), a multi-chip module (MCM), systems-in-package (SiP), systems-on-package (SoP), etc.

Exemplary Audio Processing System

FIG. 1 shows a schematic representation of an audio processing system 10 with an intelligent microphone module 100 embedded in a listening device 120 in accordance with an embodiment of the present disclosure.

As depicted in FIG. 1, an audio source 110 may transmit sound waves in the direction of the device 120. The audio source 110 may be a human user speaking to the device 120. In other embodiments, the audio source 110 may be any audio source (e.g., music, audio from a television show or movie, or noise). For example, some smartphone applications are capable of listening to music or television audio to identify the song or television show, respectively. Other audio sources (not shown), such as interfering audio sources, may also be transmitting sound waves in the direction of the device 120.

The embedded intelligent microphone module 100 may receive sound waves from the audio source 110 or other audio sources (not shown) as analog audio signals at, for example, a microphone array component of the intelligent microphone module 100. Additional components of the intelligent microphone module 100 may convert and process the audio signals accordingly. The processed digital audio signals may be communicated to the device 120 or directly to a remote service for further processing. In other embodiments, the processed digital audio signals may be converted to recognized speech by an ASR component of the intelligent microphone module 100, or speech information may be extracted from the processed digital audio signals by the ASR component of the intelligent microphone module 100.

For example, the processed digital audio signals may optionally be communicated via connection 131 to a preprocessing service 130. Preprocessing service 130 may include additional hardware or software for further enhancing the digital audio signals. The further enhanced digital audio signals may be communicated back to the device 120 via connection 131 or directly to a remote service such as ASR service 140 via connection 135. In other embodiments, preprocessing service 130 is performed within the device 120, such as by a central processing unit (CPU) of the device 120.

In some embodiments, the digital audio signals (or the further enhanced digital audio signals) may optionally be communicated to ASR service 140 via connection 141. As previously described, the ASR service 140 may perform speech recognition or other value-added services such as executing search queries based on the recognized speech or other audio. In some embodiments, the ASR service 140 may record received digital audio signals for future processing or analysis. The ASR service 140 may communicate the text of the recognized speech or other information (e.g., search results) back to the device 120 via connection 141 or directly to a remote business service such as business service 150 via connection 145. In other embodiments, the ASR service 140 may be embedded within the device 120.

In some embodiments, the digital audio signals, the further enhanced digital audio signals, or the information received from the ASR service 140 may optionally be communicated to the business service 150 via connection 151. The business service 150 may record, respond, or otherwise react to the received digital audio signals or other information. For example, the business service 150 could an application programming interface (API) or other server interface to a user's account with the business service (e.g., an Amazon.com account). In the example of an Amazon.com account, the business service 150 (i.e., Amazon.com) may be configured to execute commands related to the user's Amazon.com account, such as storing items in a user's cart or returning search results from Amazon's inventory. Another exemplary business service 150 may be the Twitter API. For example, the business service 150 may cause the user's recognized speech to be tweeted via the user's Twitter account. In other embodiments, the business service 150 may be embedded business logic executed within the device 120.

Each of the connections 131, 135, 141, 145, and 151 may be a wired connection or a wireless connection. In some embodiments, one or more of the connections 131, 135, 141, 145, and 151 may be communicated over a network (e.g., the Internet). They may be communicatively coupled to the interface module 160 of the intelligent microphone module 100. In some embodiments, the connections 131, 135, 141, 145, and 151 may be communicatively coupled to an interface of the device 120. In some embodiments (not shown), one or more of the connections 131, 135, 141, 145, and 151 may be internal connections among embedded modules within the device 120.

Each of the services 130, 140, and 150 may be a single computing device or a group of networked devices. Each of the services 130, 140, and 150 may include Internet connectivity (e.g., cloud-based services), or they may be limited to a corporate or otherwise private local area network (LAN) or wireless local area network (WLAN). Each of the services 130, 140, and 150 may be remote or otherwise external to the device 120, or they may be embedded or otherwise implemented within the device 120.

Exemplary Devices and Systems Having the Intelligent Microphone

Figure 2A:
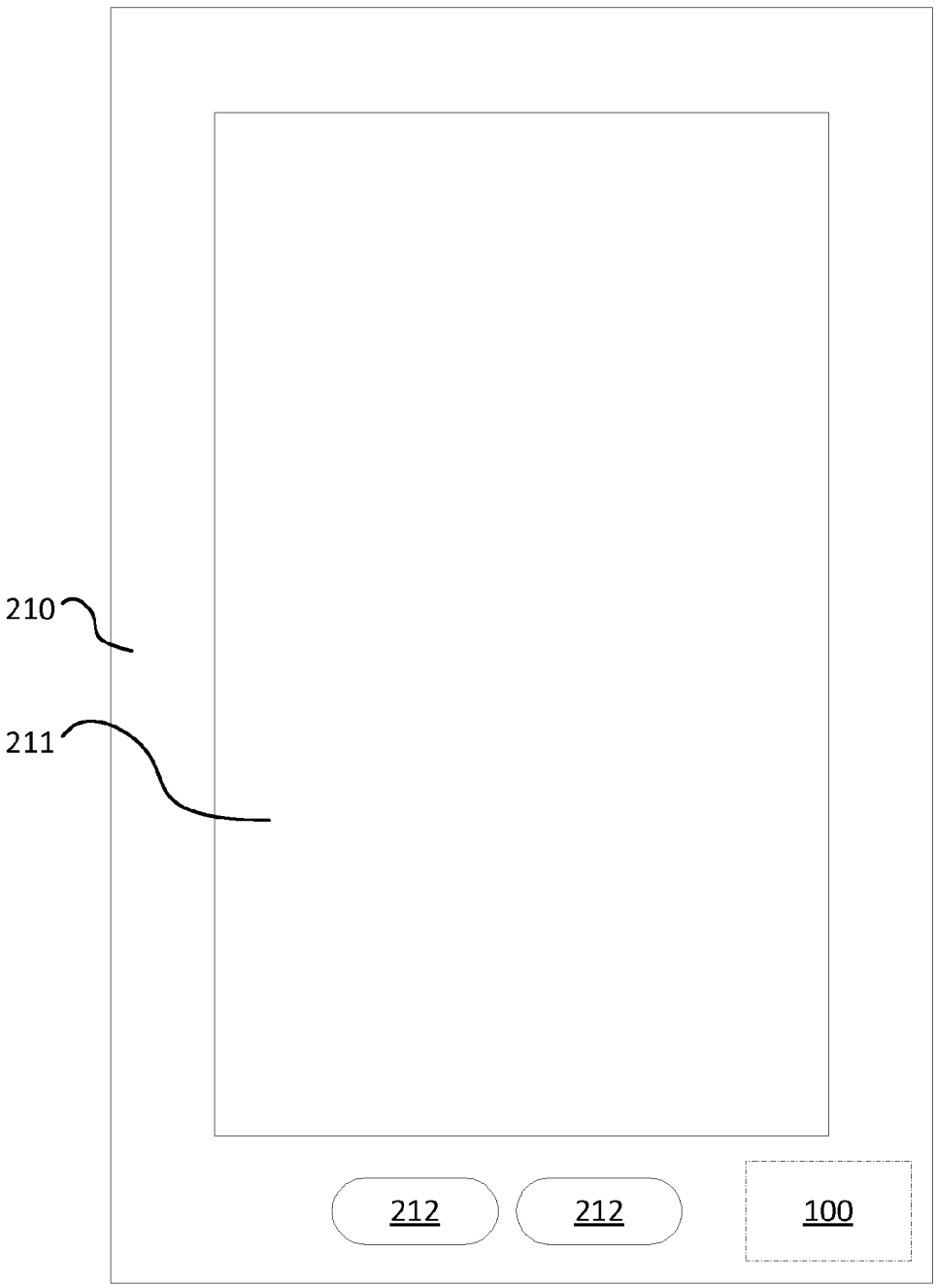
FIG. 2A depicts a schematic representation of a device with a display and an integrated intelligent microphone module in accordance with some embodiments of the present disclosure.
Figure 2B:
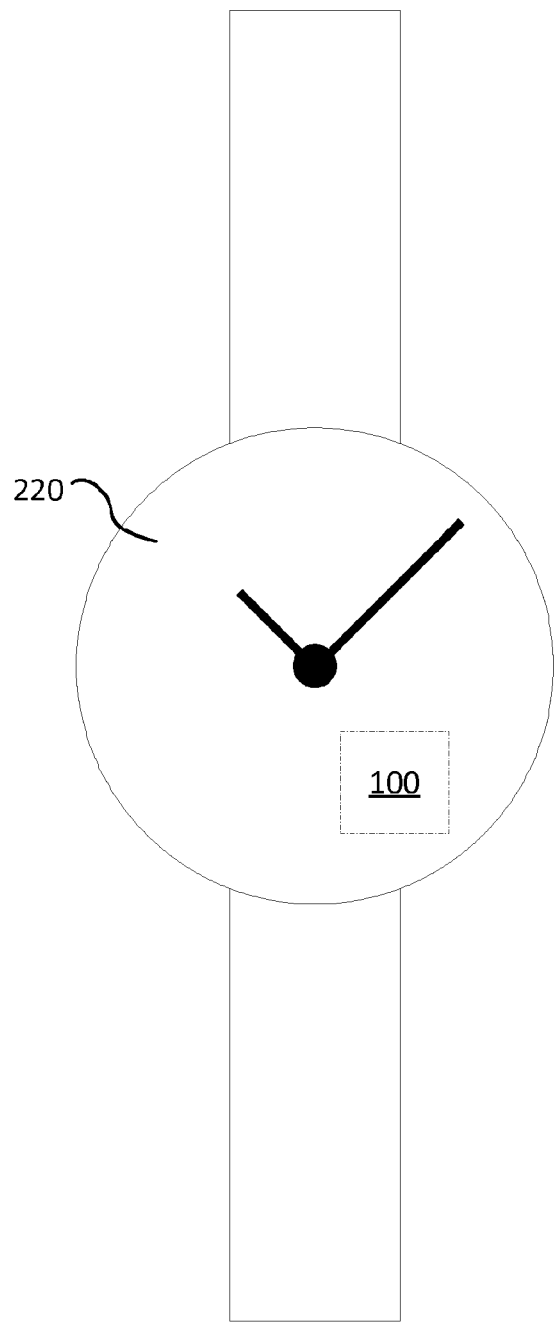
FIG. 2B depicts a schematic representation of a wearable device with an integrated intelligent microphone module in accordance with some embodiments of the present disclosure.
Figure 2C:
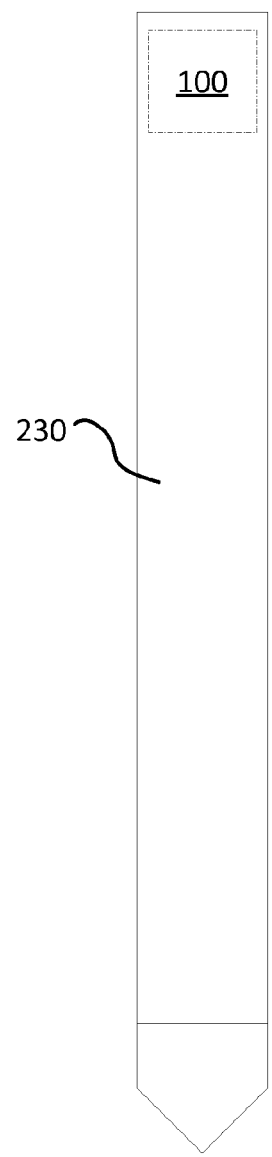
FIG. 2C shows a schematic representation of a handheld device with an integrated intelligent microphone module in accordance with some embodiments of the present disclosure.

Referring to FIGS. 2A, 2B, and 2C, intelligent microphone module 100 may be embedded or otherwise attached to a variety of devices and systems. FIGS. 2A, 2B, and 2C depict exemplary schematic representations of devices embedded with intelligent microphone modules in accordance with embodiments of the present disclosure.

In FIG. 2A, a display-based device 210 is shown with embedded intelligent microphone module 100. In the embodiment of FIG. 2A, the display-based device 210 is a smartphone, including display 211 and buttons 212. In other embodiments, the display-based device 210 may be a tablet, phablet, laptop, medical device, vital signs monitoring device, consumer electronic device, home appliance, home security device, industrial process control device, a mobile computing device, or any other device with a display including, but not limited to, a television, computer, or other display.

The display-based device 210 may be configured to display information related to the digital audio signals processed by intelligent microphone module 100. For example, intelligent microphone module 100 may receive speech input that an ASR service interprets as a query (e.g., "What is the weather today?"), and the display-based device 210 may be configured to display the text of the query (e.g., "What is the weather today?") or the results of the query (e.g., 70 degrees Fahrenheit and sunny).

In FIG. 2B, a wearable device 220 is shown with embedded intelligent microphone module 100. In the embodiment of FIG. 2B, the wearable device 220 is a watch. In other embodiments, the wearable device 220 may be a fitness tracking bracelet or device, headset, clothing, eyewear, or any other wearable device designed to receive and process audio signals. The wearable device 220 may include a display or other screen that may be similar to the display-based device 210.

In FIG. 2C, a handheld device 230 is shown with embedded intelligent microphone module 100. In the embodiment of FIG. 2C, the handheld device 230 is a pen. In other embodiments, the handheld device 230 may be a wand (e.g., Amazon Dash device), key fob, or any other handheld device designed to receive and process audio signals. The handheld device 230 may include the option of being worn similar to the wearable device 220, or it may include a display or other screen that may be similar to the display-based device 210.

The embodiments and preceding descriptions of FIGS. 2A, 2B, and 2C are merely exemplary and not limiting of the present disclosure. In other embodiments (not shown), the intelligent microphone module 100 may be embedded or otherwise attached in various other form factors and types of devices. For example, the intelligent microphone module 100 may be embedded in a car, bicycle, or other mobile vehicle, fitness equipment, appliances (e.g., refrigerators, microwaves, blenders, etc.), networked device, toys, smart-home devices (e.g., thermostats, smoke detectors, lighting systems, music systems, robotic vacuums, temperature control systems, security systems, etc.), electronic motes (e.g., a node wireless sensor network with a microcontroller, transceiver, Internet of Things node, or other components), or any other suitably connected electronic device configured to receive audio input and provide/enable voice interfaces.

Exemplary Modules in the Intelligent Microphone

Figure 3:
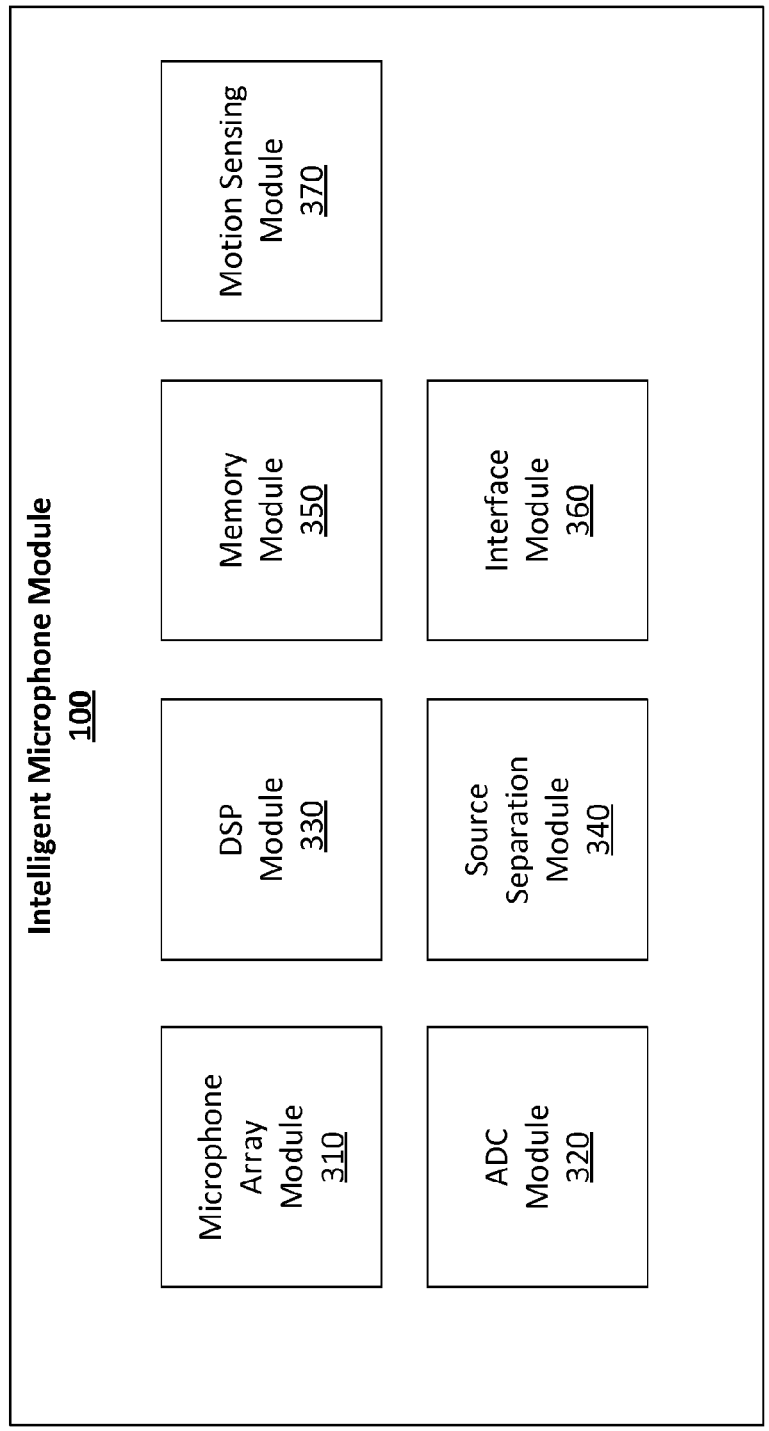
FIG. 3 shows a block diagram of an intelligent microphone module in accordance with some embodiments of the present disclosure.

Referring to FIG. 3, an intelligent microphone (e.g., the intelligent microphone module 100 depicted in FIGS. 1 and 2A-2C), may comprise several integrated components to receive and process analog audio signals into speech information, recognized speech, and/or voice commands for an embedding device (e.g., device 320, such as display-based device 210, wearable device 220, handheld device 230, etc.). FIG. 3 shows a block diagram of an intelligent microphone module 100 in accordance with an embodiment of the present disclosure. As illustrated, the intelligent microphone module 100 may include one or more components including microphone array module 310, analog-to-digital converter (ADC) module 320, digital signal processor (DSP) module 330, audio source separation module 340, memory module 350, interface module 360, and motion sensing module 370.

Intelligent microphone module 100 may be a single unit, a single package or microchip comprising an application-specific integrated circuit (ASIC), or integrated circuits, which implement(s) the modules 310 to 360. In some embodiments, intelligent microphone module 100 may include a printed circuit board. The printed circuit board may include one or more discrete components, such as an array of microphones (not shown) in microphone array module 310, or an antenna or input/output pins (not shown) in interface module 360. One or more integrated circuits may be assembled on the printed circuit board and permanently soldered or otherwise affixed to the printed circuit board. In other embodiments, the package or the discrete elements may be interchangeably attached to the printed circuit board to promote repairs, customizations, or upgrades. The intelligent microphone module 100 may be contained within a housing or chassis to form a single unit or a single package.

Intelligent microphone module 100 may be configured to be embedded within another device or system. In other embodiments, the intelligent microphone module 100 may be configured to be portable or interchangeably interface with multiple devices or systems.

Exemplary Microphones

According to some embodiments, the microphone array module 310 may be a microphone array that includes at least two microphone elements arranged according to a predetermined geometry, spacing, or orientation. The microphone array module 310 can generate respective analog audio signals corresponding to distinct microphones in the microphone array. For example, as described herein with reference to FIGS. 4A and 4B, the microphone array module 310 may be a quad microphone with four microphone elements. The microphone elements of the microphone array module 310 may be spaced apart sufficient to detect measurable differences in the phases or amplitudes of the audio signals received at each of the microphone elements. In other embodiments, the intelligent microphone module 100 may include a single microphone element instead of an array of multiple microphone elements such as microphone array module 310.

In some embodiments, the microphone array module 310 may include microelectromechanical systems (MEMS) microphones such as Analog Devices ADMP504. The MEMS microphones may be analog or digital, and they may include other integrated circuits such as amplifiers, filters, power management circuits, oscillators, channel selection circuits, or other circuits configured to complement the operation of the MEMS transducers or other microphone elements.

The microphone elements of the microphone array module 310 may be of any suitable composition for detecting sound waves. For example, microphone array module 310 may include transducers and other sensor elements. The transducer elements may be configured for positioning at ports on the exterior of a device or system.

Exemplary Digital Processing and Analog Processing

The microphone array module 310 may be in electrical communication with ADC module 320. ADC module 320 may convert analog audio signals received by the microphone array module 310 into digital audio signals. Each microphone element of the microphone array of microphone array module 310 may be connected to a dedicated ADC integrated circuit of the ADC module 320, or multiple microphone elements may be connected to a channel of a multi-channel ADC integrated circuit of the ADC module 320. ADC module 320 may be configured with any suitable resolution (e.g., a 12-bit resolution, a 24-bit resolution, or a resolution higher than 24 bits). The format of the digital audio signals output from ADC module 320 may be any suitable format (e.g., a pulse-density modulated (PDM) format, a pulse-code modulated (PCM) format). ADC module 320 may connect to a bus interface, such as Integrated Interchip Sound (I2S) electrical serial bus. In some embodiments, ADC module 320 may be specially configured, customized, or designed to convert the known range of analog audio signals received by the microphone elements of the microphone array module 310 because the ADC module 320 and the microphone array module 310 are components of an integrated intelligent microphone module 100.

Digital audio signals converted by the ADC module 320 may be communicated to a processor, such as a digital signal processor (DSP) in the DSP module 330. DSP module 330 may be configured with any DSP or other processor suitable for processing the digital audio signals that it receives. DSP module 330 may execute instructions for processing the digital audio signals. The instruction (stored in non-transitory computer-readable memory in the intelligent microphone) may be configured to improve or enhance the digital audio signals to prepare the digital audio signals for further processing by other modules or by an external service, such as a remote (e.g., cloud-based) automated speech recognition (ASR) service. For example, in some embodiments, enhancements may include noise reduction or suppression, echo cancellation, fixed or adaptive audio/acoustic beamforming (i.e., spatial filtering or beamsteering). These examples are not limiting, and it is within the scope of the present disclosure for the DSP to perform any available digital audio signal routine or algorithm for processing, improving, or enhancing the digital audio signals. The intelligent microphone module 100 may be configured to receive updated or upgraded instructions to include new or improved digital audio signal processing routines or algorithms.

DSP module 330 may receive instructions to execute from an integrated memory module such as memory module 350. Memory module 350 may be any suitable non-transitory processor readable medium for storing instructions, such as non-volatile flash memory. In some embodiments, memory module 350 may include a read only memory (ROM) module. In other embodiments, memory module 350 may include rewritable memory that may receive updates or upgrades to the firmware or other instructions. The type, speed, or capacity of memory module 350 may be specially configured, customized, or designed for the firmware or other instructions to be executed by DSP module 330 because memory module 350 and DSP module 330 may be components of an integrated intelligent microphone module 100.

Audio processing using an intelligent microphone in accordance with the present disclosure as described herein may involve the processing of input data and the generation of output data to some extent. This input data processing and output data generation may be implemented in hardware or software. For example, specific electronic components may be employed in an intelligent microphone module or similar or related circuitry for implementing the functions associated with an intelligent microphone module in accordance with the present disclosure as described above. Alternatively, one or more processors operating in accordance with instructions may implement the functions associated with an intelligent microphone module in accordance with the present disclosure as described above. If such is the case, such instructions may be stored on one or more non-transitory processor readable storage media (e.g., a magnetic disk or other storage medium), such as memory module 150, or transmitted to one or more processors via one or more signals.

Any functionalities or parts of the digital audio processes described herein can be executed by DSP module 330, but in some embodiments, these processes can be carried out by circuitry designed specifically for the functionality. Such circuitry can include application-specific circuitry, logic blocks, analog circuitry, etc.

While many of the disclosed embodiments describe processes being carried out by DSP module 330, it is understood that analog circuitry having similar functionality can be used in place of some of the digital processing being performed by the DSP module 330.

Beamforming

In some embodiments, DSP module 330 or the instructions executed by DSP module 330 may be specially configured, customized, designed, or programmed to process the known quality and quantity of digital audio signals that it receives from ADC module 320 because DSP module 330 and ADC module 320 may be components of an integrated intelligent microphone module 100. For example, DSP module 330 may be specially configured to perform beamforming for a known geometry of the microphone module 310. In some embodiments in which the microphone module 310 is a quad microphone (e.g., the quad microphone depicted in FIGS. 4A and 4B), DSP module 330 may be configured to perform beamforming by processing four streams of digital audio signals for each of four microphone elements arranged in a known geometry of the quad microphone. If the device can determine the approximate direction of an audio source of interest (e.g., audio source 110), it can filter out interfering audio sources coming from different directions. In some embodiments, the beamformer will be fixed, such that it assumes the speaker is always oriented in a particular location or direction relative to the device (e.g., the driver in a car). In other embodiments, the device could perform adaptive beamforming, steering the beam as the location of the speaker changes.

In some cases, one or more of the beamforming functionalities are performed by other circuitry (e.g., digital and/or analog circuitry outside of the DSP module 330).

Source Separation

In some embodiments, DSP module 330 or the instructions executed by DSP module 330 may perform some or all of the audio processing within the intelligent microphone 100. In some embodiments, DSP module 330 may offload some of the audio processing to other integrated circuitry of the intelligent microphone module 100. For example, intelligent microphone module 100 may include a source separation module 340 that includes integrated circuits for separating or otherwise isolating audio sources from the digital audio signals that may represent a combination of audio sources. Source separation module 340 may be configured to isolate a user's voice input from other audio sources such as background or environmental noise. Source separation module 340 may be configured to perform beamforming or portions of a beamforming or other source separation signal processing algorithms. Cooperation between source separation and beamforming can be very beneficial, since beamforming can greatly affect source models being used to separate sources. Without integration, cooperation between the source separation module 340 and the beamforming would have been impossible to achieve. In some embodiments, dedicated integrated circuits such as the source separation module 340 may be specially configured, customized, or designed to process the known quality and quantity of digital audio signals received from the DSP module 330 because the source separation module 340 and the DSP module 330 may be components of an integrated intelligent microphone module 100.

In some cases, one or more source separation functionalities are performed by other circuitry (e.g., digital and/or analog circuitry outside of the DSP module 330). For instance, source separation probability calculations can be performed with analog circuitry.

Automatic Speech Recognition

In some embodiments, the intelligent microphone module 100 may perform automatic speech recognition (ASR). ASR may be performed by DSP module 330 or a separately integrated ASR module (not shown). In these embodiments, memory module 350 may be further configured to store information related to performing ASR, including, but not limited to, ASR dictionaries, ASR neural networks, and ASR coefficients.

In some cases, one or more ASR functionalities are performed by other circuitry (e.g., digital and/or analog circuitry outside of the DSP module 330). For instance, ASR probability calculations can be performed with analog circuitry.

Other Exemplary Functionalities

Other examples of audio processing that may be performed by DSP module 300 include, but are not limited to, automatic calibration, noise removal (e.g., wind noise or noise from other sources), automatic gain control, high-pass filtering, low-pass filtering, clipping reduction, Crest factor reduction, or other preprocessing or post-processing functionality. In some cases, one or more of these functionalities are performed by other circuitry (e.g., digital and/or analog circuitry outside of the DSP module 330).

DSP module 330 may also be configured to perform power management or power saving functions. For example, if intelligent microphone module 100 is not in use, DSP module 330 may enter a low-power (e.g., sleep or standby) state. Intelligent microphone module 100 may include sensors (e.g., buttons, switches, motion activation, voice or keyword activation) to determine whether DSP module 330 should enter or leave the low-power state. In other embodiments, intelligent microphone module 100 may receive electrical signals from a device or system indicating that the DSP module 330 should enter or leave the low-power state. In some cases, one or more of the power saving functionalities are performed by other circuitry (e.g., digital and/or analog circuitry outside of the DSP module 330).

Interfaces

Additionally, the intelligent microphone module 100 may include an interface module 360 that includes one or more interfaces for communicating processed digital audio signals or other signals between the intelligent microphone module 100 and another device or system. For example, in some embodiments, interface module 360 may include wired interfaces such as pin-outs of a package or bus connectors (e.g., a standard Universal Serial Bus (USB) connector or an Ethernet port). In other embodiments, interface module 360 may include wireless interfaces such as IEEE 802.11 Wi-Fi, Bluetooth, or cellular network standard interfaces such as 3G, 4G, or LTE wireless connectivity. Interface module 360 may be configured to communicate with an electrically connected device in which the intelligent microphone module 100 is embedded or otherwise attached. In other embodiments, interface module 360 may be configured to communicate with remote or cloud-based resources such as an ASR service. Interface module 360 may be configured or designed to accommodate a variety of ports or customized for particular circuit boards to accommodate different devices.

Sensors

In some embodiments, the intelligent microphone module 100 may also include a motion sensing module 370 for sensing movement of the intelligent microphone module 100. The motion sensing module 370 may include sensors (not shown) such as a multi-axis (e.g., three-axis) accelerometer, a multi-axis (e.g., three-axis) gyroscope, or both. The motion sensing module 370 may receive data from it sensors to determine movement (e.g., translation, acceleration, and rotation in three-dimensional space). In some embodiments, the motion sensing module 370 may push movement information to another component of the intelligent microphone module 100, such as DSP module 330. In other embodiments, another component of the intelligent microphone module 100, such as DSP module 330, may periodically request updated information from the motion sensing module 370.

The intelligent microphone module 100 may use information from the motion sensing module 370 to determine changes in position or orientation of the microphone array module 310 of the intelligent microphone module 100 relative to an audio source of interest. In some embodiments, the intelligent microphone module 100 may be configured to adjust its beamforming functionality in response to movement detecting by the motion sensing module 370.

Exemplary Quad Microphone

Figure 4A:
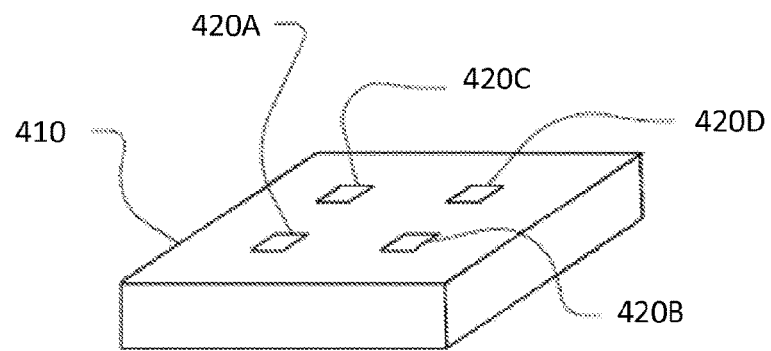
FIG. 4A shows a perspective view of a microphone array in accordance with some embodiments of the present disclosure.

With reference to FIG. 4A, the microphone array module 310 may be a quad microphone 410 with four microphone elements (e.g., microphone elements 420A-D). The four microphone elements 420A-D may be arranged according to a known geometry. For example, the four microphone elements 420A-D may be arranged in a square configuration (as shown). In other embodiments, the four microphone elements 420A-D may be arranged serially or linearly, or the four microphone elements 420A-D may be arranged in a circular or rectangular configuration, or any other suitable configuration.

The known geometry may also include a known size and spacing of the four microphone elements 420A-D. For example, the four microphone elements 420A-D may form a 1.5 mm$^2$, 2 mm$^2$, or other suitably sized configuration.

Each microphone element 420A, 420B, 420C, and 420D may be a MEMS element and may be coupled to each of four corresponding microphone ports (not shown) as part of the interface module 360 or another component of the intelligent microphone module 100, housing, or chassis.

Figure 4B:
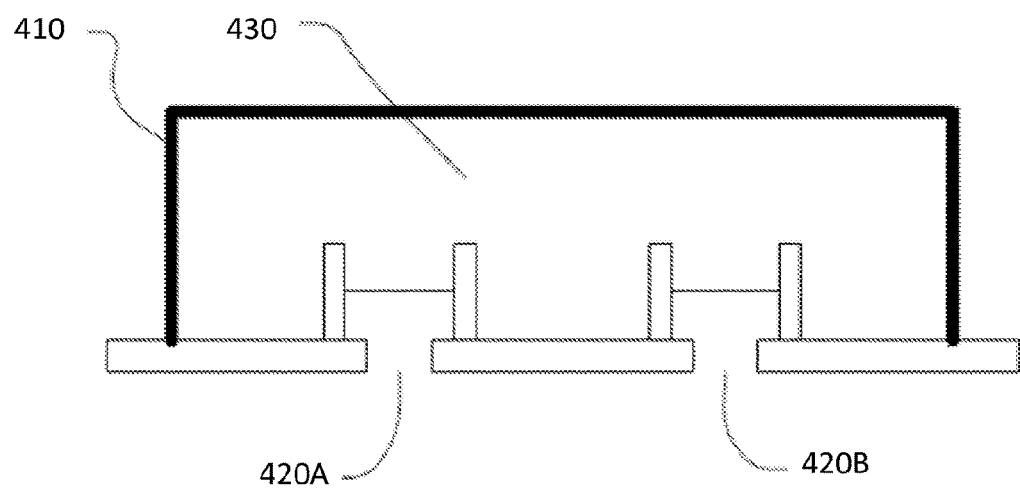
FIG. 4B shows a cross-sectional view of a microphone array in accordance with some embodiments of the present disclosure.

With reference to FIG. 4B, each of the four microphone elements 420A-D may share a common backvolume 430. In other embodiments, each microphone element 420A, 420B, 420C, and 420D may be configured to use an individually partitioned backvolume.

Exemplary Audio Processing Method

Figure 5:
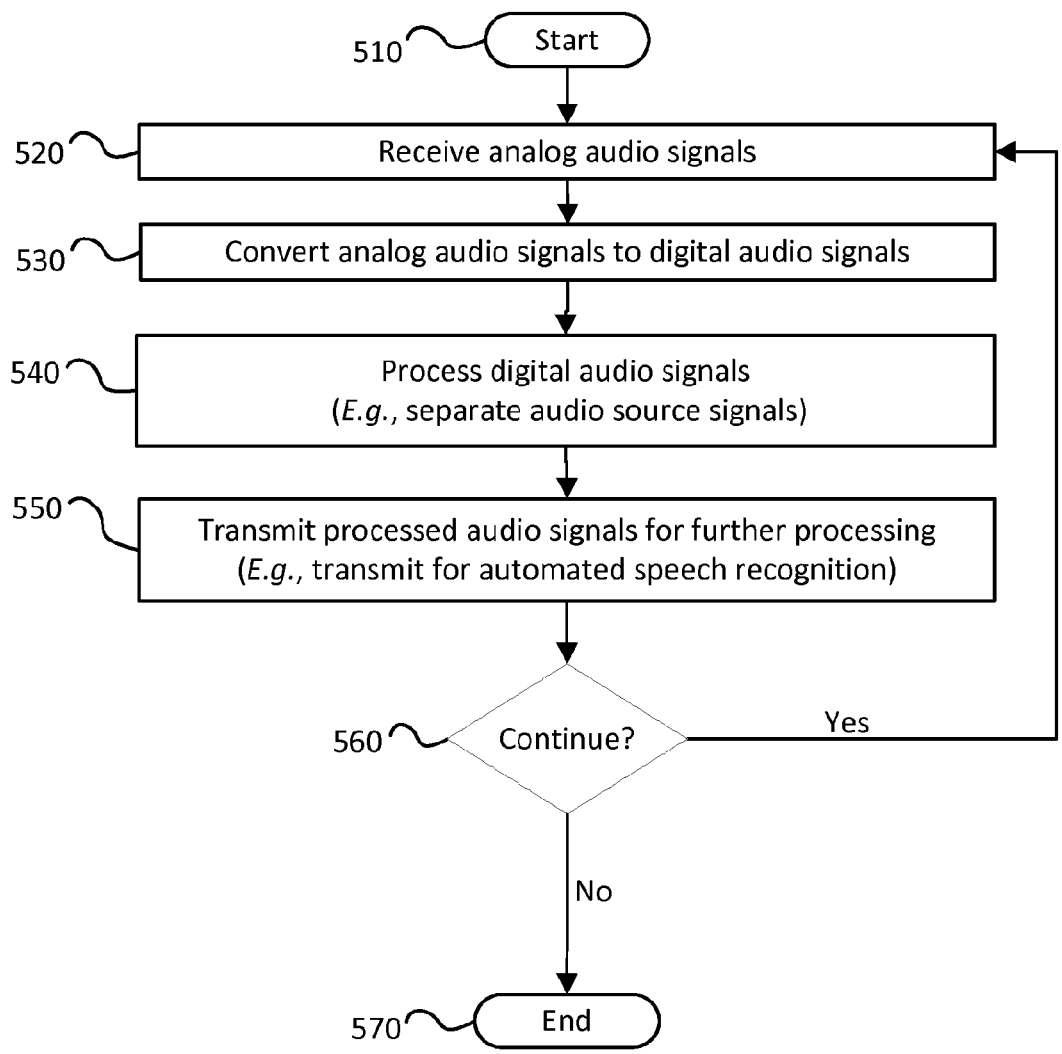
FIG. 5 depicts a method for audio processing using an intelligent microphone in accordance with some embodiments of the present disclosure.

FIG. 5 depicts a method 500 for audio processing using an intelligent microphone 100 in accordance with an embodiment of the present disclosure. At block 510, the method may begin. At block 520, analog audio signals may be received by one or more microphones, such as by microphone array module 310. At block 530, the analog audio signals may be converted to digital audio signals by one or more ADCs, such as by ADC module 320. At block 540, the digital audio signals may be processed. For example, the digital audio signals may be processed by DSP module 330 or source separation module 340. Processing may include beamforming, noise reduction, source separation, or any other suitable technique including the previously described audio processing techniques. At block 550, processed audio signals may be transmitted for automated speech recognition. For example, the processed audio signals may be transmitted to a remote ASR service 140 as previously described. At block 560, a determination may be made as to whether there is more audio input to receive and process. If yes, the method 500 returns to block 520 for further processing. If no, the method 500 ends at block 570. For example, a signal may be received that indicates a low-power or sleep mode, in which case the method 500 may end at block 570. In some embodiments, multiple instances of method 500 or portions of method 500 may be executed in parallel. For example, sound waves may be received at four microphone elements of a microphone array 310, and the four streams of analog audio signals may be converted to digital analog signals simultaneously.

In some embodiments, method 500 may be configured for a pipeline architecture. A first portion of a digital audio signal may be transmitted at block 550, at the same time a second portion of the digital audio signal may be undergoing processing such as source separation processing at block 540, at the same time a third portion of the digital audio signal may be undergoing conversion from an analog signal to a digital signal at block 530, at the same time a fourth portion of an (analog) audio signal is being received at block 520.

Exemplary Advanced Modules of the Intelligent Microphone

Figure 6:
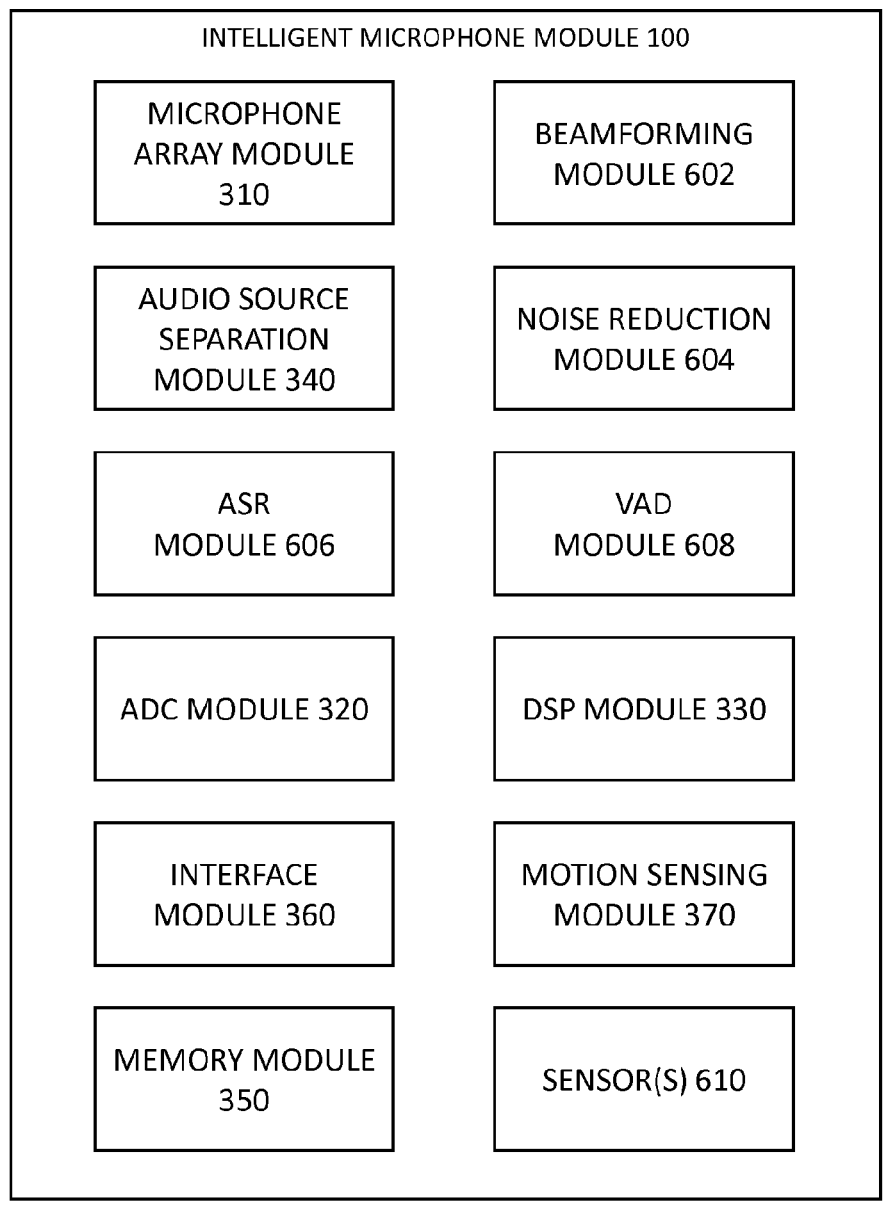
FIG. 6 shows a block diagram of an intelligent microphone module in accordance with some embodiments of the present disclosure.

Referring to FIG. 6, an intelligent microphone (e.g., the intelligent microphone module 100 depicted in FIGS. 1, 2A-2C, and 3), may comprise several integrated components to receive and process analog audio signals into speech information, recognized speech, and/or voice commands for an embedding device (e.g., device 320, such as display-based device 210, wearable device 220, handheld device 230, etc.). FIG. 6 shows a block diagram of an intelligent microphone module 100 in accordance with an embodiment of the present disclosure. As illustrated, the intelligent microphone module 100 may include one or more components similar to or same as the modules seen in FIG. 3. For instance, the intelligent microphone 100 may include one or more of the following: a microphone for generating one or more respective analog audio signals, or if applicable, a microphone array module 310 for generating respective analog audio signals corresponding to distinct microphones in the microphone array.

The intelligent microphone can include circuitry for processing the one or more respective analog audio signals. The circuitry can include one or more of the following: analog-to-digital converter (ADC) module 320, digital signal processor (DSP) module 330, audio source separation module 340, memory module 350, interface module 360, and motion sensing module 370. In some embodiments, the circuitry can include one or more of the following: beamforming module 602, noise reduction module 604, ASR module 606, voice activity detecting module 608, and one or more further sensors 610. Any part of these modules can be implemented within DSP module 330. In some embodiments, any part of these module can be implemented with digital and/or analog circuitry outside of the DSP module 330.

The circuitry can include one or more analog-to-digital converters (e.g., part of ADC module 320) for converting the one or more respective analog audio signals to one or more respective digital audio signals, and a digital signal processing circuitry (part of DSP module 330) for processing the digital audio signals.

The circuitry can include a network interface (e.g., part of interface module 360) for sending processed digital audio signals to a remote automatic speech recognition service over the network, and/or other interfaces as described herein.

Adding Control Paths, Feedback Paths, and Feedforward Paths to Improve Audio Processing When these modules are integrated in a single package or a single unit, these modules can provide control, feedback, and/or feedforward paths between each other to enhance the performance and quality of the audio processing carried out by the intelligent microphone. Integration of these modules together in a single package or a single unit to provide a full end-to-end solution allows these modules to fine tune or dynamically adapt in many beneficial and unexpected ways.

These control, feedback, and/or feedforward paths are otherwise difficult and cumbersome (if not unpractical or impossible) to provide if these modules were implemented as discrete/unintegrated components or parts. For instance, discrete parts may not necessarily expose internal parameters of the processes, thus fine tuning those parameters is not possible. While some of these parts may expose the parameters, fine tuning the parameters may require a great deal of experimentation and research to understand how these parts may interact with each other. After significant effort, one may end up with a system that could be unstable since one is unlikely to fully understand the internal processes within these discrete parts (imagine them as black boxes).

Source separation module 340 can perform computational analysis on the audio signals from the microphone array module 310 or microphone to separate one or more sources of audio (e.g., sources from different speakers, one or more noise sources), and/or to remove noise (which is also a source) from the audio signal to improve the quality of a signal. Generally speaking, the source separation module 340 can separate sources present in the respective analog audio signals and generate one or more improved audio signals. In source separation, estimates/statistics determined from models of sources are often used to separate or unmix sources. The source separation module 340 may use parameters such as sensitivity parameter(s), threshold(s), and/or weights (with the estimates/statistics) to separate or unmix sources. These parameters can greatly affect the quality of separated audio signals.

ASR module 606 can extract speech information in the one or more improved audio signals. Speech information can include one or more of the following: whether speech is present, identifier(s) for utterances detected, timestamps or timecodes of detected utterances, etc. When detecting speech (e.g., using a statistical method), the ASR module 606 can measure/determine the confidence level of extracted speech information, e.g., a probability value that a particular word, speech, and/or command was present in the audio signal. This confidence level can include a variety of confidence measures, word posterior probabilities, whether utterances detected indeed matches up with natural speech, reliability of extracted speech information, error measures, correctness measures, likelihood score, etc. Note that the confidence level is greatly affected by the quality of the audio signals and/or the level of noise present in the audio signals. When the audio signals has poor quality and/or a significant amount of noise, it is unlikely that the ASR module 606 can detect speech with a high confidence level. Conversely, the audio signals has good quality and/or a little amount of noise, it is more likely that the ASR module 606 can detect speech with a high confidence level. When the confidence level is low, the confidence level of the ASR module 606 may be indicating that the audio signals are noisy, or are of bad quality.

When detecting speech (e.g., using a statistical method), the ASR module 606 can use parameters, such as sensitivity parameters or thresholds for deciding on extracted speech information (e.g., "is the probability high enough to decide that an utterance was present in the audio signal"). These parameters can greatly affect the accuracy of the ASR module 606 in extracting speech information, since the parameters can affect the error rate of the ASR module 606.

Beamforming module 602 can adaptively steer a beam of the microphone. Beamforming module 602 can include microphone matching filters for matching amplitude or phase of microphones. Beamforming module 602 further includes beam steering filters for steering/delaying signals from the microphone. Beamforming module 602 can be tuned in a variety of ways using one or more parameters, since the beamforming functionalities are usually adaptive. The filter coefficients can be changed to certain values. The size, direction, and location of the beam being formed can be changed. The number of microphones and/or selection of microphones can be changed. The beamforming functionalities can be turned on or off completely. The beamforming module 602 can halt or restart adaptive beamforming. The beamforming module 602 can revert back to default or predetermined settings for its parameters. These parameters can affect many different aspects of the beamforming module 602, in particular, the beam being formed by the beamforming module.

Noise reduction module 604 can reduce noise in the one or more respective analog audio signals. The noise reduction module 602 can include an ambient noise removal module, which can be configured to reduce/remove ambient noise based on measured/artificial/estimated ambient noise from the audio signals. Filters and/or gain control can be implemented to reduce/remove ambient noise (e.g., a high pass filter, band pass filter, low pass filter, etc.) in the one or more respective audio signals. The noise reduction module 602 can include wind noise detector and/or removal module, which can be configured to indicate that wind noise is present and/or remove/reduce wind noise from the one or more respective audio signals. Filters and/or gain control can be implemented to modify the audio signals in the presence of wind noise. Coefficients of filters and/or gain control of the noise reduction module 602 can be tuned. These coefficients can affect the performance of the noise reduction module 604.

Voice activity detecting module 608 can detect voice activity in the one or more respective analog audio signals. In some embodiments, the voice activity detecting module 608 can include a formant filter, which is tuned with (bandpass, low pass, high pass) filters for detecting energy in certain frequency bands characteristic of vowel formants to coarsely detect whether voice activity is present in the one or more respective audio signals. Various illustrative voice activity detectors suitable for the voice activity detecting module 608 are described in U.S. Provisional Patent Application 62/022,749 titled "LOW-COMPLEXITY VOICE ACTIVITY DETECTION" (filed on Jul. 10, 2014), U.S. Provisional Patent Application 62/059,275 titled "LOW-COMPLEXITY VOICE ACTIVITY DETECTION" (filed on Oct. 3, 2014), and U.S. Provisional Patent Application 62/147,503 titled "LOW-COMPLEXITY VOICE ACTIVITY DETECTION" (filed on Apr. 14, 2015), PCT Patent Application PCT/US2015/039406 titled "LOW-COMPLEXITY VOICE ACTIVITY DETECTION") which are all incorporated herein by reference in their entirety. Other suitable voice activity detectors can be used as well. Generally speaking, voice activity detecting module 608 can use one or more parameters when processing the one or more respective audio signals and/or deciding whether voice is present, e.g., sensitivity parameter(s), threshold(s), attack time constant(s), release/decay time constant(s), etc. These parameters can affect the accuracy of the voice activity detecting module 608.

One or more further sensors 610 can include one or more of the following: proximity sensors for sensing an object or person near the intelligent microphone, distance sensor for determining distance of the object or person near the intelligent microphone, pressure sensor for detecting pressure changes in the air near the intelligent microphone, etc. These sensors can be implemented using capacitive sensors.

Figure 7:
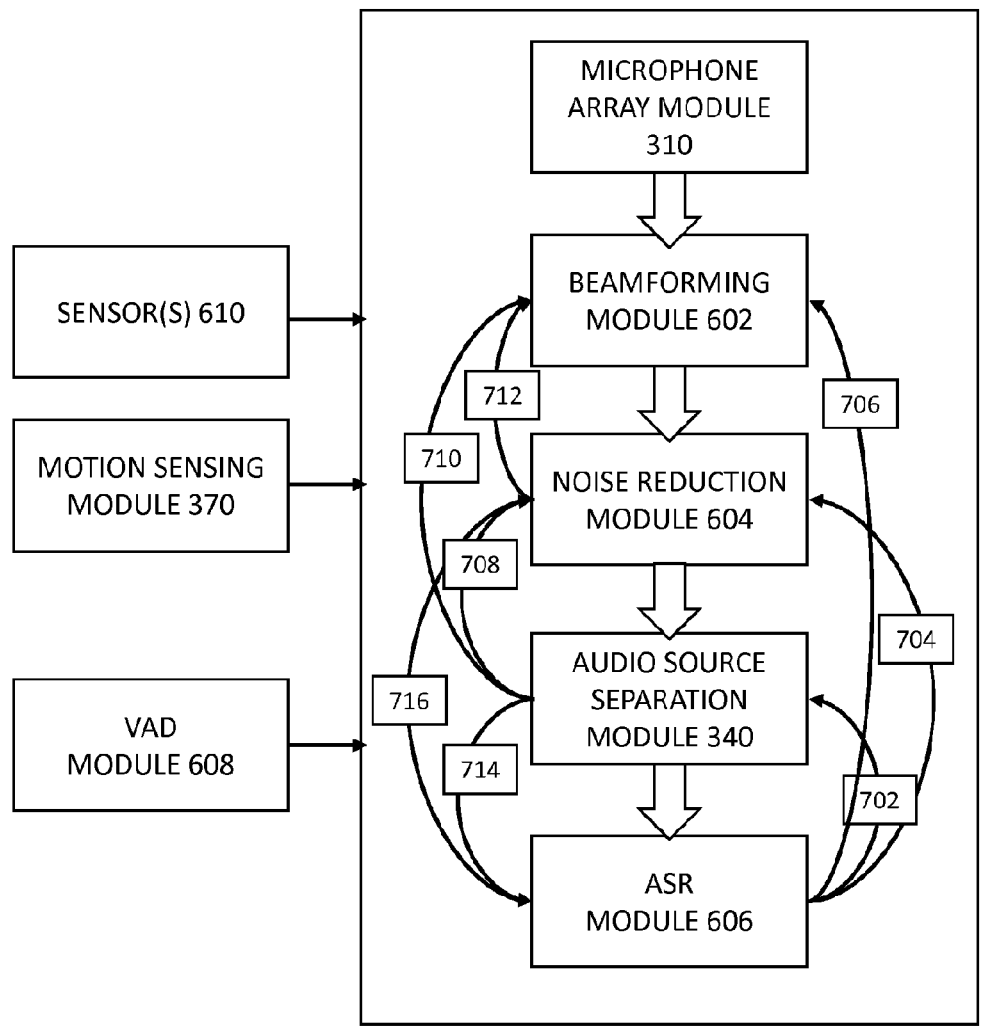
FIG. 7 illustrates exemplary signal flow within an intelligent microphone module in accordance with some embodiments of the present disclosure.

FIG. 7 illustrates exemplary signal flow within an intelligent microphone module in accordance with an embodiment of the present disclosure. The example shown serves to illustrate possible control, feedback, and/or feedforward paths for tuning the intelligent microphone to improve performance. Typically, signal flow or processing follows this general order: beamforming, noise reduction, audio source separation, voice activity detection, automatic speech recognition. One or more of these processes can sequentially modify the audio signals, and the modified audio signal is provided to a subsequent process. For instance, the beamforming module 602 can generate a beamformed audio signal for the noise reduction module 604. The noise reduction module 604 can process the beamformed signal to remove noise and generate a cleaned up audio signal for the audio source separation module 340. The audio source separation module 340 can generate multiple audio signals corresponding to different sources based on the cleaned up audio signal. One or more of the multiple audio signals are provided to the ASR module 606 so that speech information can be extracted. Generally speaking, the performance of the ASR module can depend on the quality of the input signal to the ASR module, which means the performance of the ASR module can depend on the performance of other processes responsible for improving the audio signal.

The signal flow or processing can vary, depending on the application. For instance, voice activity detection may be performed first, some of these processes may be performed at least in part in parallel, the ordering of the processes may be swapped, one or more of these processes may be removed, etc.

In some embodiments, the automatic speech recognition module 606 determines confidence level of extracted speech information. As explained previously, this confidence level can suggest whether the audio signal is of good quality or bad quality, since a bad quality audio signal tends to result in low confidence level of extracted speech information.

The circuitry in the intelligent microphone can comprise or implement a feedback path 702 for the confidence level of the ASR module to control one or more parameters affecting the sensitivity of the audio source separation module 340. For instance, a low confidence level can increase or decrease (depending on the implementation) one or more parameters of the source separation module to try and improve the quality of the audio signal being fed to the ASR module 606. For instance, the confidence level can increase or decrease sensitivity parameters and/or thresholds of the source separation module. A low confidence level may adjust the source separation module to use a larger filter (more number of filter taps) to improve the quality of source separation. A low confidence level may adjust one or more parameters of the source separation module which affects how the sources are unmixed. A low confidence level may increase the number of sources being modeled by the source separation module 340. As a result, the audio signal can be improved, and the confidence level of the ASR module 606 may increase and the overall performance of the intelligent microphone can be improved.

In some cases, the integrated circuit includes or implements a feedback path 704 for the confidence level of the ASR module to control one or more parameters affecting sensitivity of the noise reduction module 604. For instance, a low confidence level can increase or decrease (depending on the implementation) the sensitivity of the noise reduction module 604 to try and improve the quality of the audio signal being processed by the ASR module 606. The sensitivity of the noise reduction module 604 can be changed in a way to remove more noise from the audio signal. As a result, the noise level can be decreased to improve the quality of the audio signal. In turn, the ASR module 606 may have a higher confidence level when extracting speech information when the noise level is decreased (i.e., when the audio quality is improved).

In some cases, the integrated circuit includes or implements a feedback path 706 for the confidence level of the ASR module to control one or more parameters affecting a beam being formed by the beamforming module 602. For instance, a low confidence level can change the beam one or more ways to try and improve the performance of the ASR module 606. When the confidence level is high, which is an indication of a good quality audio signal, the size of beam can be made smaller to adaptively focus the beam towards the source as positive feedback for the beamforming module 602. When the confidence level is low, which is an indication of a bad quality audio signal, the feedback path 706 can request the beamforming module 602 to adapt the beam and/or initiate a search sequence for the source (e.g., changing the direction, increasing the size, changing the location of the beam). If the confidence level increases, the feedback path 706 can provide positive feedback that the beamforming module 602 has found the source (and possibly halt adaptive beam forming temporarily if the confidence level remains high). By improving the beam, the quality of the audio signal being processed by the ASR module 606 may ultimately improve, which in turn can increase the confidence level of the extracted speech information.

In some embodiments, the audio source separation module 340 can determine a level of noise in the audio signal (e.g., by determining how much of the signal is contributed to noise). In some embodiments, the noise reduction module 604 can determine a level of noise in the audio signal as well.

In some cases, the integrated circuit further includes or implements a feedback path 708 for the level of noise in the audio source separation module 340 to control one or more parameters affecting sensitivity of the noise reduction module 604. For instance, a low noise level in the audio source separation module 340 can increase or decrease (depending on the implementation) the sensitivity of the noise reduction module 604 to try remove more noise from the audio signal. As a result, the noise level can be decreased to improve the quality of the audio signal being processed by the audio source separation module 340. In turn, the audio source separation module 340 may be better able to separate sources in the audio signal.

In some cases, the integrated circuit further includes or implements a feedback path 710 and/or feedback path 712 for the level of noise in the audio source separation module 340 and the noise reduction module 604 respectively to control one or more parameters affecting a beam being formed by the beamforming module 602. For instance, a high noise level can change the beam one or more ways to try and improve the quality of the audio signal. When the noise level is low, which is an indication of a good quality audio signal, the size of beam can be made smaller to adaptively focus the beam towards the source as positive feedback for the beamforming module 602. When the noise level is high, which is an indication of a bad quality audio signal, the feedback path 710 and/or 712 can request the beamforming module 602 to initiate a search sequence for the source (e.g., changing the direction, increasing the size, changing the location of the beam). If the noise level decreases, the feedback path 710 and/or 712 can provide positive feedback that the beamforming module 602 has found the source. By improving the beam, the quality of the audio signal being processed by the noise reduction module 604 and/or the audio source separation module 340 may ultimately improve, which in turn can improve the performance of the ASR module 606, as well as overall performance of the intelligent microphone.

In some cases, the integrated circuit further includes or implements a feedforward path 714 and/or feedforward path 716 for the level of noise in the audio source separation module 340 and the noise reduction module 604 respectively to control the ASR module 606. As previously mentioned, the quality of the audio signal can affect the accuracy of the extracted speech information ("garbage in" and "garbage out"). A noisy signal can result in erroneous speech information being extracted. If the level of noise is greater than a certain threshold, the level of noise can signal to the ASR module 606 to stop trying to extract speech information, or request the ASR module 606 to only output only speech information extracted with a very high confidence level.

In some cases, the intelligent microphone can include sensors 610 for sensing a source near the microphone. Sensors 610 capable of detecting presence of a source (e.g., a person), distance, and/or location of the source. Such information can be provided over a control path to any one of the modules in the intelligent microphone. In one instance, the integrated circuit includes a control path for an output of the sensor to control the automatic speech recognition module. The presence of a source (or the presence of a source that is close enough to the intelligent microphone) can turn on the automatic speech recognition module. When there is no source, the automatic speech recognition module can operate in a low power, standby, or off mode. This control path prevents the automatic speech recognition module from generating extracted speech when no source is close by. In some cases, the information can be provided in a control path for an output of the sensor to control one or more parameters affecting a beam being formed by the beamforming module (such that the beam can be steered towards the source, or such that beamforming can be turned on due to the presence of a source, etc.).

In some cases, the intelligent microphone can include motion sensing module 370. The motion sensing module 370 control, using a control path, any one of the modules in the intelligent microphone, as described herein.

In some cases, the intelligent microphone can include voice activity detecting module 608 for detecting whether voice is present in the audio signals. Such information can be provided over a control path to any one of the modules in the intelligent microphone. In one instance, the integrated circuit includes a control path for an output of the voice activity detecting module to control the automatic speech recognition module. The presence of voice can turn on the automatic speech recognition module. When there is no voice, the automatic speech recognition module can operate in a low power, standby, or off mode. This control path prevents the automatic speech recognition module from generating extracted speech information when voice is not present. In some cases, the information can be provided in a control path for an output of the voice activity detecting module to control one or more parameters affecting a beam being formed by the beamforming module (such that the beam can be steered towards the source, or such that beamforming can be turned on due to the presence of voice, etc.). Voice activity detecting module can sense which one of the audio signals from microphones in the microphone array has the most voice activity (or more voice activity energy). Such information can be useful for adaptive beamforming, if the beamforming module can determine whether the source is near a particular microphone and steer the beam accordingly.

Any one or more of these control, feedback, and/or feedforward paths can be implemented with a decay time constant so that overtime the modules returns to an earlier state, and prevents overcorrection of the intelligent module system.

Advantages and Benefits of Integration

Integration of all these speech and voice modules in a single package generally results in far less parts/components of the overall device when speech and voice functionalities are desired. In turn, less parts/components reduces costs. Less parts also generally decreases development/design time, making it cheaper and easier to design the device. An integrated product works "off the shelf" and may improve the overall integration process and the overall performance and stability of the device. When less parts are used, it may be possible to reduce power consumption. Various control, feedforward, and/or feedback paths offer additional unexpected advantages as well. Even though the intelligent microphone comes in a single package, the intelligent microphone can be parameterizable to allow the intelligent microphone to adapt to different operating conditions, products, etc. For instance, certain modules can be turned on or off, or different operating modes can be selected. In some embodiments, the intelligent microphone can include parameter(s) which can be tuned for, e.g., high quality processing versus low quality processing, high power consumption versus low power consumption, number of sources expected for source separation, sensitivity to noise, sensitivity to movement, language, utterances to be detected, commands to be detected, etc.

Lowering Overall Power Consumption: Sampled Analog Technology

To achieve low power consumption, one or more parts of the intelligent microphone module can at least in part be implemented using analog circuitry (i.e., in the analog domain). Analog circuitry which leverages "sampled analog" technology can keep power consumption low for applications where precision is not a limiting factor for the application. "Sampled analog" technology not only allows samples of the audio stream to be stored and processed in analog circuitry, "sampled analog" technology also allows filters and processing to be performed in the analog domain using analog circuitry through charge sharing and/or redistribution. To better understand what analog circuitry achieves, the present disclosure references to "sampled analog" technology described in U.S. Pat. No. 8,188,753 (entitled "ANALOG COMPUTATION"), U.S. Pat. No. 8,547,272 (entitled "CHARGE SHARING ANALOG COMPUTATION CIRCUITRY AND APPLICATIONS"), U.S. Pat. No. 8,717,094 (entitled "CHARGE SHARING TIME DOMAIN FILTER"), U.S. Pat. No. 8,736,361 (entitled "HIGH PASS COUPLING CIRCUIT"). All of these referenced patents are incorporated herein by reference.

Exemplary Application: Intelligent Microphone in the Car

Voice recognition is increasingly popular in the automotive setting, since hands-free operation is paramount to safer driving. However, many cars have difficulty with voice recognition because there is a lot of noise sources in the car (or automobile). Noise sources include wind noise in the car, other people speaking in the car, the radio or sound system, road noise, etc. Without sophisticated audio processing algorithms to deal with noise, ASR performs very poorly. Automakers faces challenges to providing speech- and voice-functionalities, when direct suppliers to original equipment manufacturers have difficulties implementing sophisticated audio processing algorithms. The intelligent microphone module described herein can lower the barrier for adopting better speech- and voice-functionalities in the car, by providing the "off-the-shelf" solution that automakers can readily implement as a module within the car.

Figure 8:
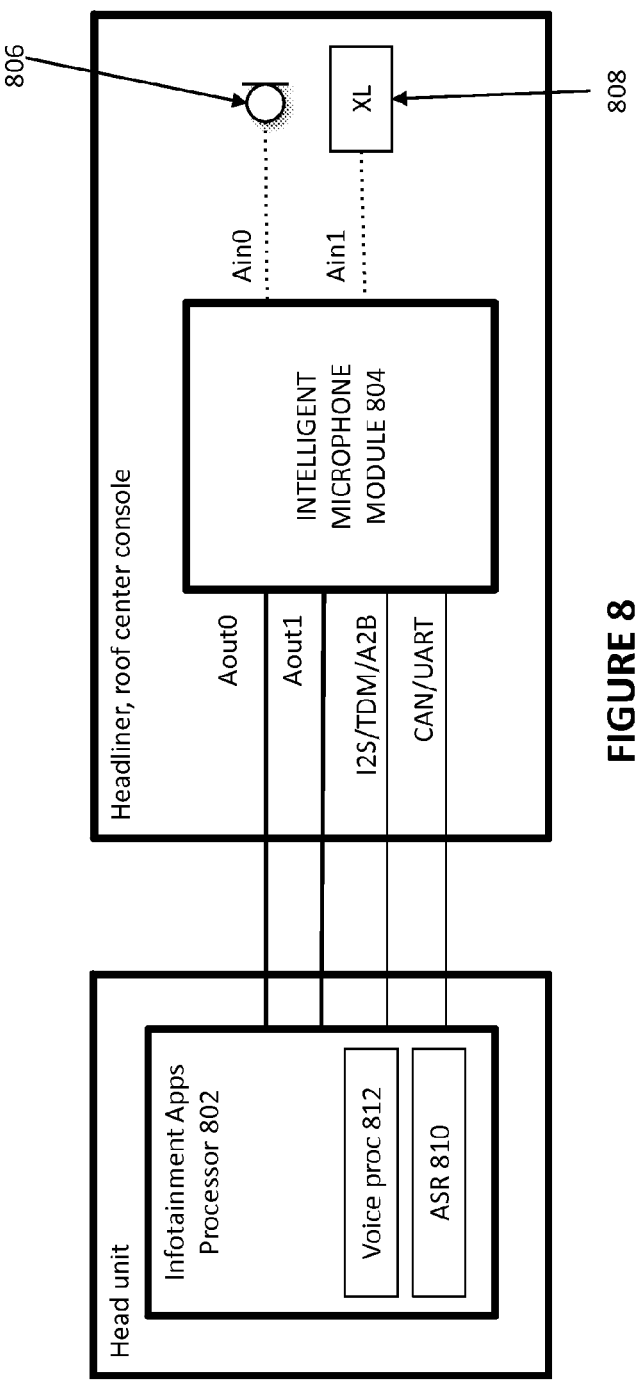
FIG. 8 illustrates an automotive system having the intelligent microphone module in accordance with some embodiments of the present disclosure.

Existing cars with voice recognition often have multiple analog mics (typically two—one near driver, one near front passenger) in a headliner, roof center console. Analog mics connect to an infotainment applications (apps) processor in the head unit. Usually, ASR and any voice processing (e.g., minimal noise reduction, beamforming, call mode audio processing, etc.) are implemented in the infotainment apps processor. To improve on these existing setups in the car, it is possible to hijack audio analog inputs to the head unit, and insert the intelligent microphone module into the headliner, roof center console. FIG. 8 illustrates an automotive system having the intelligent microphone module in accordance with some embodiments of the present disclosure. Rather than feeding raw audio from the microphones directly to the infotainment apps processor 802, the intelligent microphone module 804 can support and process audio signals (represented by Ain0) from the existing analog microphone(s) 806 in the car and/or audio signals (represented by Ain1) from external microphones 808. Further to supporting the existing microphones in the car or external microphones, the intelligent microphone module 804 can also include its own microphone (or a microphone array). The intelligent microphone module 804 can add value to the signal chain by providing advanced audio processing on the incoming audio signals and signals generated by its integrated microphone, and generating improved audio output signals Aout0 and Aout1 for the infotainment apps processor 802. The intelligent microphone module 804 can also include data inputs and/or outputs over standard or proprietary data interfaces or buses (e.g., shown as IS2, TDM, A2B, CAN, UART) to allow more interaction between the infotainment apps processor 802 and the intelligent microphone module 804. For instance, the intelligent microphone module 804 can perform any one or more of the following: beamforming, source separation, noise detection and/or reduction, voice activity detection, presence detection, etc. For instance, the intelligent microphone module 804 can run source separation to improve voice user interface ASR performance in the infotainment apps processor 802. In another instance, the intelligent microphone module 804 can pass voice audio through the intelligent microphone module 804 in call mode for standard voice processing (e.g., acoustic echo cancellation, noise reduction, spectral subtraction, beamforming, etc.). In some cases, the intelligent microphone module 804 can include an accelerometer, or receiving input from an accelerometer for active noise cancellation using co-located accelerometer and microphone.

The infotainment apps processor 802 can benefit from higher quality audio (without having to embed advanced audio processes therein and expending any effort) and the performance of ASR 810 and/or voice processing 812 in the infotainment apps processor 802 is greatly improved. The barrier to integrating advanced audio processing into a system is greatly reduced. Furthermore, the intelligent microphone module 804 includes tightly coupled and dedicated components, which means the "off-the-shelf" and "end-to-end" solution can be made to cost less, consume less power, and take up less space, when compared to having to combine many different components for providing similar features. Keeping the cost of the intelligent microphone module 804 at a minimum also lowers the barrier to integrating advanced audio processing into the system.

Variations and Implementations

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes.

In certain contexts, the intelligent microphone module discussed herein can be applicable to medical systems, scientific instrumentation, consumer electronics, security systems, automotive systems, aerospace systems, industrial process control, audio and video equipment, instrumentation, and virtually many electronic devices where speech and voice functionalities are desirable. Moreover, certain embodiments discussed above can be provisioned in products for medical imaging, patient monitoring, medical instrumentation, and home healthcare. This could include wearables, pulmonary monitors, accelerometers, heart rate monitors, pacemakers, any suitable medical device which interfaces with a human, etc. Other applications can involve automotive technologies for driver assistance systems, infotainment and interior applications of any kind Parts of various apparatuses for providing speech and voice functionalities can include electronic circuitry to perform the functions described herein. In some cases, one or more parts of the apparatus can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed signal domain. In some instances, the processor may be configured to carrying out the functions described herein by executing one or more instructions stored on a non-transitory computer medium.

In another example embodiment, the intelligent microphone may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the amplification functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of modules, the number of operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the described audio processes, illustrate only some of the possible functions that may be executed by, or within, systems illustrated in the FIGURES. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the apparatus described above may also be implemented with respect to the method or process described herein and specifics in the examples may be used anywhere in one or more embodiments.

The invention claimed is:

1. An integrated circuit for providing advanced speech processing as a single package, comprising:
 a microphone array for generating respective audio signals corresponding to distinct microphones in the microphone array;
 circuitry for processing the respective audio signals, the circuitry comprising:
  source separation module for separating sources present in the respective audio signals and generating one or more improved audio signals;
  automatic speech recognition module for extracting speech information in the one or more improved audio signals and determining confidence level of extracted speech information; and
  a feedback path for the confidence level to control one or more parameters affecting the source separation module.

2. The integrated circuit of claim 1, wherein:
 the source separation module determines a level of noise in the respective audio signals; and
 the circuitry further includes a feedforward path for the level of the noise to control the automatic speech recognition module.

3. The integrated circuit of claim 1, further comprising:
 one or more sensors for sensing a source near the microphone array;
 wherein the circuitry further includes a control path for an output of the one or more sensors to control the automatic speech recognition module.

4. The integrated circuit of claim 1, wherein:
 the circuitry for processing the respective audio signals further comprises a voice activity detecting module for detecting voice activity in the respective audio signals; and
 the circuitry further includes a control path for an output of the voice activity detecting module to control the automatic speech recognition module.

5. An integrated circuit for providing advanced speech processing as a single package, comprising:
 a microphone array for generating respective audio signals corresponding to distinct microphones in the microphone array; and
 circuitry for processing the respective audio signals, the circuitry comprising:
  a noise reduction module for reducing noise in the respective audio signals and generating one or more improved audio signals;
  an automatic speech recognition module for extracting speech information in the one or more improved audio signals and determining confidence level of extracted speech information; and
  a feedback path for the confidence level to control one or more parameters affecting sensitivity of the noise reduction module.

6. The integrated circuit of claim 5, wherein:
 the circuitry for processing the respective audio signals further comprises:
  a source separation module for separating sources present in the respective audio signals and determining a level of noise in the one or more improved audio signals; and
  a feedback path for the level of noise to control one or more parameters affecting sensitivity of the noise reduction module.

7. The integrated circuit of claim 5, wherein:
 the noise reduction module determines a level of noise in the respective audio signals; and
 the circuitry further includes a feedforward path for the level of the noise to control the automatic speech recognition module.

8. An integrated circuit for providing advanced speech processing as a single package, comprising:
 a microphone array for generating respective audio signals corresponding to distinct microphones in the microphone array; and
 circuitry for processing the respective audio signals comprises:
  a beamforming module for adaptively steering a beam of the microphone array;
  a source separation module for separating sources present in the respective audio signals and determining a level of noise in the respective audio signals; and
  a feedback path for the level of noise to control one or more parameters affecting the beam being formed by the beamforming module.

9. An integrated circuit for providing advanced speech processing as a single package, comprising:
- a microphone array for generating respective audio signals corresponding to distinct microphones in the microphone array; and
- circuitry for processing the respective audio signals comprises:
  - a beamforming module for adaptively steering a beam of the microphone array;
  - a noise reduction module for determining a level of noise in the respective audio signals; and
  - a feedback path for the level of noise to control one or more parameters affecting the beam being formed by the beamforming module.

10. An integrated circuit for providing advanced speech processing as a single package, comprising:
- a microphone array for generating respective audio signals corresponding to distinct microphones in the microphone array; and
- one or more sensors for sensing a source near the microphone array;
- circuitry for processing the respective audio signals, the circuitry comprising:
  - a beamforming module for adaptively steering a beam of the microphone array;
  - an automatic speech recognition module for extracting speech information in the respective audio signals and determining confidence level of extracted speech information;
  - a feedback path for the confidence level to control one or more parameters affecting the beam being formed by the beamforming module; and
  - a control path for an output of the one or more sensors to control one or more parameters affecting the beam being formed by the beamforming module.

11. The integrated circuit of claim 10, wherein the microphone array is a quad microphone comprising four microphone elements arranged in a geometric configuration.

12. An integrated circuit for providing advanced speech processing as a single package, comprising:
- a microphone array for generating respective audio signals corresponding to distinct microphones in the microphone array; and
- circuitry for processing the respective audio signals, the circuitry comprising:
  - a beamforming module for adaptively steering a beam of the microphone array;
  - an automatic speech recognition module for extracting speech information in the respective audio signals and determining confidence level of extracted speech information;
  - a feedback path for the confidence level to control one or more parameters affecting the beam being formed by the beamforming module;
  - a voice activity detecting module for detecting voice activity in the respective audio signals; and
  - a control path for an output of the voice activity detecting module to control one or more parameters affecting the beam being formed by the beamforming module.

13. An integrated circuit for providing advanced speech processing as a single package, comprising:
- a microphone array for generating respective audio signals corresponding to distinct microphones in the microphone array;
- circuitry for processing the respective audio signals, the circuitry comprising:
  - a beamforming module for adaptively steering a beam of the microphone array;
  - an automatic speech recognition module for extracting speech information in the respective audio signals and determining confidence level of extracted speech information;
  - a feedback path for the confidence level to control one or more parameters affecting the beam being formed by the beamforming module; and
  - a motion sensing module for sensing movement of an electronic device having the microphone array and the circuitry; and
- wherein the beamforming module determines changes in position or orientation of the microphone array relative to an audio source of interest based on the respective audio signals and movement information from the motion sensing module adjusts beamforming functionality in response to the changes.

14. A method for audio processing within a single integrated package, the method comprising:
- generating audio signals by microphones of a microphone array within the single integrated package; and
- processing the audio signals by circuitry in the same integrated package as the microphone array, wherein:
  - the circuitry in the same integrated package includes two or more of the following modules: source separation module, automatic speech recognition module, adaptive beamforming module, noise reduction module, and voice activity detection module; and
  - the processing includes:
    - determining a confidence level of extracted speech information by the automatic speech recognition module; and
    - controlling one or more parameters affecting a sensitivity of the source separation module based on the confidence level.

15. The method of claim 14, further comprising:
transmitting over a network interface the processed audio signals to a remote automatic speech recognition service over a network.

16. The method of claim 14, wherein the processing comprises:
controlling, based on the confidence level, one or more parameters affecting one or more of: a sensitivity of the noise reduction module and a beam formed by the adaptive beamforming module.

17. A method for audio processing within a single integrated package, the method comprising:
- generating audio signals by microphones of a microphone array within the single integrated package; and
- processing the audio signals by circuitry in the same integrated package as the microphone array, wherein:
  - the circuitry in the same integrated package includes two or more of the following modules: source separation module, automatic speech recognition module, adaptive beamforming module, noise reduction module, and voice activity detection module; and
  - the processing includes:
    - determining a level of noise by one or more of: the source separation module and the noise reduction module; and
    - controlling one or more parameters affecting a beam formed by the adaptive beamforming module based on the level of noise.

18. A method for audio processing within a single integrated package, the method comprising:

generating audio signals by microphones of a microphone array within the single integrated package; and processing the audio signals by circuitry in the same integrated package as the microphone array, wherein:

the circuitry in the same integrated package includes two or more of the following modules: source separation module, automatic speech recognition module, adaptive beamforming module, noise reduction module, and voice activity detection module; and the processing includes:

determining a level of noise by one or more of: the source separation module and the noise reduction module; and controlling the automatic speech recognition module based on the level of noise.

19. The method of claim 18, wherein controlling the automatic speech recognition module to stop extracting speech information if the level of noise is greater than a threshold.

20. The method of claim 18, wherein controlling the automatic speech recognition module comprises requesting the automatic speech recognition module to only output speech information extracted above a certain confidence level if the level of noise is greater than a threshold.

* * * * *